United States Patent
Ohmi et al.

(10) Patent No.: US 6,869,579 B2
(45) Date of Patent: Mar. 22, 2005

(54) PROCESS FOR TREATING EXHAUST GAS (75) Inventors: Tadahiro Ohmi, Sendai (JP); Yoshio Ishihara, Tokyo (JP)

(73) Assignee: Nippon Sanso Corporation, Tokyo (JP)

(*) Notice: Subject to any disclaimer, the term of this patent is extended or adjusted under 35 U.S.C. 154(b) by 290 days.

(21) Appl. No.: 09/901,433

(22) Filed: Jul. 9, 2001

(65) Prior Publication Data
US 2003/0007917 A1 Jan. 9, 2003

(51) Int. Cl.⁷ ................................................ A62D 3/00
(52) U.S. Cl. ............................... 423/240 S; 423/240 R
(58) Field of Search ..................... 423/240 S, 240 R; 588/248

(56) References Cited

U.S. PATENT DOCUMENTS

| | | | |
|---|---|---|---|
| 2,595,620 A | 5/1952 | Wagner et al. | |
| 4,526,769 A | 7/1985 | Ingle et al. | |
| 5,401,872 A | 3/1995 | Burgie et al. | |
| 5,716,590 A | 2/1998 | Roewer et al. | |
| 6,238,636 B1 * | 5/2001 | Zhou et al. | 423/292 |
| 6,375,911 B1 * | 4/2002 | Ohmi et al. | 423/240 S |

FOREIGN PATENT DOCUMENTS

WO    WO 9930809 A1 *  6/1999   ........... B01D/53/86

* cited by examiner

Primary Examiner—Steven Bos
Assistant Examiner—Edward M. Johnson
(74) Attorney, Agent, or Firm—Merchant & Gould P.C.

(57) ABSTRACT

A process for treating and recovering CVD exhaust gas is provided, which can reduce periodical maintenance by converting the raw gas employed and the intermediate products contained in the CVD system into highly volatile halides, separating and recovering them as materials with good reusability. An unreacted raw gas and intermediate products contained in CVD exhaust gas are partially decomposed by being subject to decomposition treatment or conversion reaction treatment, and then halogenosilane gas and hydrogen chloride are separated and recovered. Alternatively, a raw gas and intermediate products are decomposed into hydrogen chloride and recovered.

2 Claims, 7 Drawing Sheets

PROCESS FOR TREATING EXHAUST GAS

BACKGROUND OF THE INVENTION

1. Field of the Invention

The present invention relates to a process and an apparatus for treating and recovering an exhaust gas let out from a chemical vapor deposition (CVD) system, more particularly to a process and an apparatus for treating and recovering an exhaust gas let out from CVD system for forming silicon epitaxial films, polycrystalline films or amorphous films using halogenosilane gases in a semiconductor manufacturing process.

2. Description of the Prior Art

The epitaxial (single crystal growth) process, which is a silicon CVD process, is employed for preparation of substrate for field-effect MOS(metal-oxide-semiconductor) transistor or for formation of emitter layers in bipolar transistors.

The epitaxial process is generally carried out by using a halogenosilane gas such as TCS(trichlorosilane) or DCS (dichlorosilane) which is diluted with hydrogen as a raw gas before introduction into a process chamber and by heat-decomposing the raw gas by heating the substrate placed in the process chamber to about 1100° C. to effect deposition of silicon on the substrate.

The above process is generally carried out under a pressure condition of atmospheric to 100 Pa (Pascal).

Meanwhile, the polycrystal growth process is employed for forming gate electrodes of field effect MOS transistor and ground layers for capacitors.

In the polycrystal growth process, a halogenosilane gas such as TCS or DCS is diluted with hydrogen, and the thus diluted gas is introduced into a process chamber in which a substrate heated to about 800° C. is loaded to effect heat decomposition of the raw gas to achieve deposition of silicon on the substrate. This processing is usually carried out under a vacuum condition of about 100 Pa.

Further, in such process, for the purpose of control of moisture to be adsorbed by wafers as they are loaded in and out of the process chamber, a moisture monitor, e.g., Fourier Transform infrared spectrometer (FT-IR) is occasionally attached to an exhaust piping system.

In such crystal growth process as described above, the amount of the raw gas which contributes actually to the deposition of silicon on the substrate is about 5%, and the most of the remining raw gas is exhausted without contribution together with intermediate products (about several % of the total amount) from the chamber.

The exhaust gas let out from the chamber is detoxicated by a detoxicating device which removes the raw gas and the intermediate products, and only hydrogen as the carrier gas and nitrogen as the purge gas are released into the atmosphere.

In the epitaxial process, however, there is a problem that intermediate products (by-products) formed during the process adhere or deposit on the inner wall surface of the exhaust piping to be likely to cause clogging of the exhaust piping with the deposit.

Such intermediate products are compounds of silicon and chlorine or compounds of silicon and hydrogen. These compounds form polymers at room temperatures on the inner wall surface of the exhaust piping.

The formed polymers are converted to highly reactive (self-ignitable or explosive) materials, for example, polysiloxanes, by the moisture contained in the atmosphere.

Accordingly, when the exhaust piping is dissembled to be open to the atmosphere in order to remove the polymers deposited in the inner wall surface of the exhaust piping, various preparations and contrivances are required, being causative of dropping the operation efficiency of the CVD system.

Further, it is practiced to feed an etching gas such as chlorine trifluoride ($CIF_3$) into the exhaust piping in order to prevent deposition of the polymers.

It is true, however, that the intermediate products or the polymers deposited on the inner wall surface of the piping can be removed according to this method, but the method involves a problem in that the exhaust piping itself is corroded by the strong etching property of the etching gas or the etching gas can even cause formation of holes in the piping.

Further, the etching gas such as chlorine trifluoride and the raw gas employed in the epitaxial process cannot usually be treated by the same detoxicating device, so that a plurality of detoxicating units must be used selectively depending on the gas which is fed.

On the other hand, there is a proposed method, in order to prevent intermediate products from adhering or depositing on the exhaust piping, to heat the piping constantly to a temperature of about 150° C.

According to this method, however, if the temperature of the piping is low at some parts, the intermediate products are deposited selectively to such low-temperature parts.

The piping between the detoxicating device and the CVD system usually contains complicated bends from the requirement of reducing the installation area, and it is difficult to heat or heat-insulate the piping uniformly. Actually, the maintenance of the piping has been carried out by dissembling the piping to remove the intermediate products deposited at the low-temperature portions.

While a scrubber employing water is frequently used for detoxification of TCS or DCS, solid silicon dioxide ($SiO_2$) is formed by the reaction between water and TCS or DCS, so that the circulation water employed in the scrubber is provided with means for removing $SiO_2$. However, since the removed $SiO_2$ contains hydrogen, it cannot be exhausted as such. Thus, it has been practiced to carry out treatment of $SiO_2$ by reacting it with hydrogen fluoride (HF). Since these procedures are carried out as periodical maintenance of the detoxicating device, not only the operation rate of the CVD system is lowered, but also chemical agents for removing the $SiO_2$ formed, personnel, etc. cost additionally.

SUMMARY OF THE INVENTION

It is an object of the present invention to provide a process and an apparatus for treating and recovering an exhaust gas let out from a CVD system, which can reduce or eliminate periodical maintenance of the exhaust piping and detoxicating devices by converting the raw gas employed and the intermediate products produced in the crystal growth process into highly volatile halides, exhausting them to separating and recovery unit without causing adhesion or deposition in the exhaust piping system and separating and recovering them as materials with good a reusability.

In order to attain the above object, a process for treating and recovering a CVD exhaust gas according to the present invention, especially for treating and recovering an exhaust gas let out from a CVD system for forming a silicon film using a halogenosilane gas, is provided, and the process comprises subjecting of an unreacted raw gas and intermediate products included in the exhaust gas to a partial decomposition or conversion reaction treatment and separating and recovering the obtained halogenosilane gas and hydrogen chloride gas, wherein the conversion reaction treatment is carried out by bringing the exhaust gas into contact with a metal reacting agent heated to 400° C. or higher and the separation is carried out by a distillation separation of the treated exhaust gas, Further, the process according to the present invention for treating an exhaust gas let out from a CVD system for forming a silicon film using halogenosilane comprises subjecting an unreacted raw gas and intermediate products included in the exhaust gas to a full decomposition or conversion reaction treatment and recovering the thus hydrogen chloride, wherein the decomposition treatment is carried out by using a metal reacting agent for thermal-swing between room temperature and 500° C.

The apparatus for treating and recovering a CVD exhaust gas according to the present invention, especially for treating and recovering an exhaust gas let out from a CVD system for forming a silicon film using a halogenosilane gas, is provided with decomposition reaction means for carrying out partial decomposition of an unreacted raw gas and intermediate products contained in the exhaust gas, separation means for separating halogenosilane and hydrogen chloride from an exhaust gas let out from the decomposition reacting means, vapor-liquid contact means for bringing the hydrogen chloride separated from separated by the separation means into contact with water and gas recovering means for reutilizing the halogenosilane gas.

The apparatus for treating and recovering a CVD exhaust gas according to the present invention, especially for treating and recovering an exhaust gas let out from a CVD system for forming a silicon film using a halogenosilane gas, is provided with decomposition reaction means for carrying out entire decomposition of an unreacted raw gas and intermediate products contained in the exhaust gas and vapor-liquid contact means for bringing the hydrogen chloride discharged from the separation means into contact with water.

BRIEF DESCRIPTION OF THE DRAWING

For fuller understanding of the nature and objects of the present invention, references should be made to the following detailed description taken in conjunction with the accompanying drawing in which.

DETAILED DESCRIPTION OF PREFERRED EMBODIMENTS

Figure 1:
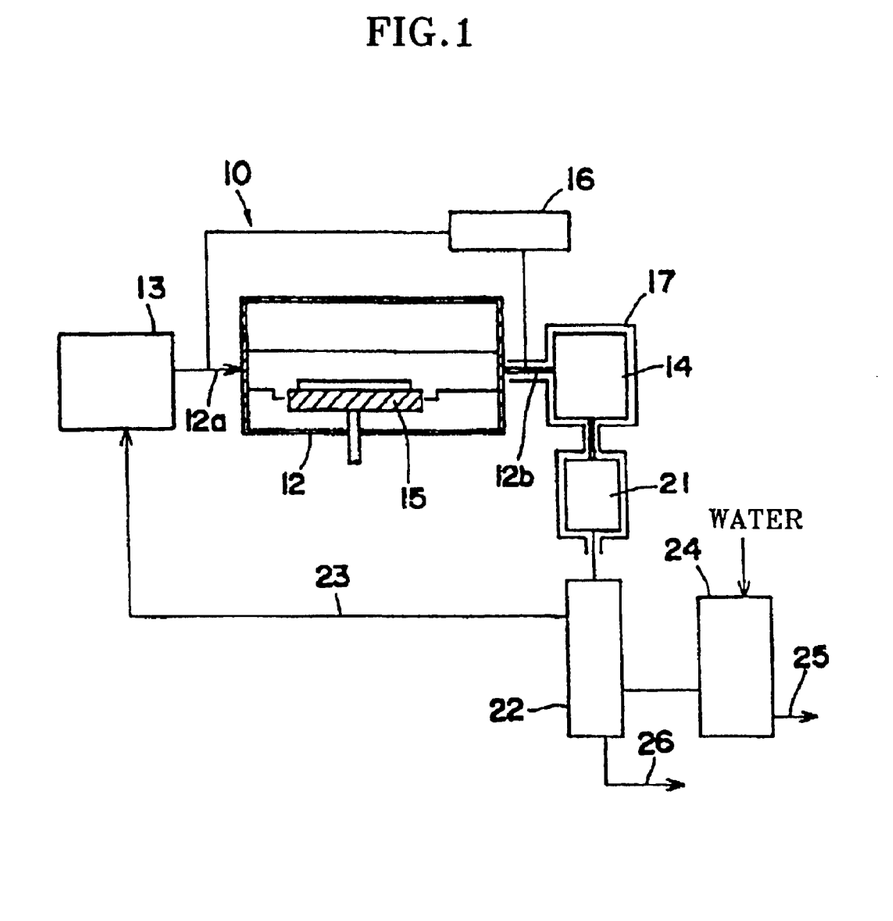
FIG. 1 is a system diagram showing the $1^{st}$ embodiment of a CVD system according to the present invention.
Figure 2:
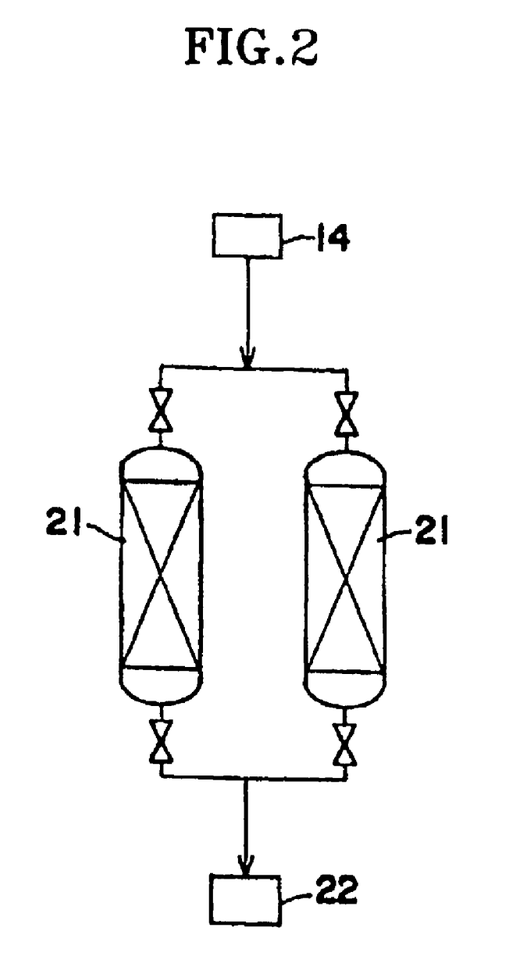
FIG. 2 is a simplified system diagram showing an example of a reactor of the $1^{st}$ embodiment.

FIG. 1 is a system diagram showing the 1st embodiment of an apparatus for treating and recovering a CVD exhaust gas according to the present invention, and FIG. 2 is a simplified system diagram showing an example of a reactor.

At first, we explain the subject system, i.e., a CVD system forming silicon films by using a halogenosilane gas. The CVD system 10 of this embodiment, generally called as single-wafer-processing lamp-heating type of silicon epitaxial apparatus, is provided with a process chamber 12 for loading substrates(wafers)11, a raw gas source 13 for supplying a raw gas, a cleaning gas, a purge gas and a carrier gas into the process chamber 12 and an exhaust pump 14 for exhausting the gases from the process chamber 12.

The above process chamber 12 is juxtaposed to a loading chamber (not shown) via a gate valve (not shown). The process chamber 12 is provided with a heating equipment (lamp: not shown) for heating a susceptor 15 for loading the wafer 11 and the wafer 12 itself to a predetermined temperature.

This CVD system carries out epitaxial growth on the wafer 11, while the process chamber 12 is maintained to have an internal pressure of 1 atm under flow of raw gas diluted with a diluent gas and under exhaustion.

To describe, for example, a typical sequence for carrying out p-type epitaxial growth, a wafer is introduced through the gate valve into the process chamber to be loaded on the susceptor under flow of a purge gas nitrogen at a flow rate of 2 L(liter)/min.

When the gate valve is closed, the feed gas is switched from the nitrogen gas to hydrogen gas (flow rate:1.5 L/min) to provide a hydrogen atmosphere in the process chamber, and also the wafer is heated to 1200° C.

After a wafer planarization treatment at 1200° C. in an atmosphere of 1 atm for 30 seconds, the wafer heating temperature is lowered to 1150° C. and supply of an epitaxial growth gas under the 1 atm condition is started to carry out a treatment for 2 min.

A mixed gas of a gas containing 15 g/min of TCS (trichlorosilane) in 7 L/min of hydrogen and a gas containing 150 cc/min of diborane in 14.6 L/min of hydrogen is used.

Incidentally, when DCS(dichloroborane) is used in place of TCS, DCS is supplied at a rate of 10 g/min, while the heating temperature of the wafer 12 is changed to 1080° C. Further, when an n-type epitaxial growth layer is to be formed in place of p-type, phosphine is supplied in place of diborane. At this time, the flow rate of phosphine is the same as that of diborane.

After completion of the treatment, the feed gas is switched from the epitaxial reaction gas to 10 L/min of nitrogen gas, and the treated wafer is unloaded.

Next, the feed gas is switched to a mixed gas of nitrogen gas and hydrogen chloride gas.

While the mixed gas is supplied at a rate of 7 to 15 L/min to maintain the mixed gas atmosphere in the processing chamber, the matters adhered or deposited in the process chamber are removed with the temperature and pressure being maintained at 1150° C. and 1 atm respectively.

Finally, the feed gas is switched again to 10 L/min of nitrogen gas, and the temperature of the susceptor is lowered to around room temperature. Thus, a cycle of treatment process is completed and returns to the first step of wafer loading.

As described above, gases of various components are exhausted depending on the step into the process chamber 12 from the raw gas source.

In order to prevent a gas self-decomposition reaction from occurring when a gas is switched, in particular a self-decomposition reaction of a raw gas per se resulted from a reaction between a very small amount of water adsorbed on the surface of the piping and a raw gas such as TCS or DCS, it is preferred that the portion from the gas mixing part to the inlet of the process chamber is formed of stainless steel heated around 400° C. under weak acidic and strong reductive condition and then subjected to a chromium oxide film formation on the inner surface thereof, or several % of aluminum-contained stainless steel heated around 900° C. under weak acidic and strong reductive condition and then subjected to an alumina film formation on the inner wall surface thereof.

Further, in order to monitor whether the decomposition reaction occurs or water content generated in the process chamber during taking in and out the wafer, it is preferred that a gas inlet portion 12a and a gas outlet portion 12b of the process chamber 12 are equipped with a moisture meter 16 using a optical means.

In particular, it is most preferred that a moisture meter 16 is a spectrometer in which a source of light is a semiconductor laser diode. This makes it possible to precisely understand and control the atmosphere of the process chamber and to reduce the generation of dummy wafers.

On the other hand, an apparatus for treating and recovering an unreacted raw gas and intermediate products contained in the exhaust gas let out from the process chamber 12 is installed in the exhaust pump 14 such as an exhaust piping including a screw pump, and provided with a reactor 21 as a decomposition reaction means for decomposition or conversion of the unreacted raw gas and high-boiling intermediate products contained in the exhaust gas, a separator 22 for separating halogenosilane gas and hydrogen chloride gas by distillation of the exhaust gas let out from the reactor 21, a recovering passage 23 as a gas recovering means for returning the halogenosilane gas such as TCS after the distillation in the separator 22 to the raw gas source 13 and reusing it, and a vapor-liquid contactor as a means for bring the hydrogen chloride separated by distillation into contact with water.

According to the sequence as described above, from the CVD apparatus 10, gases of various components are exhausted, depending on the step, into the exhaust piping to flow via the exhaust pump 14 into the reactor 21.

While the reactor 21 is, as above, to carry out decomposition or conversion reaction of the unreacted raw gas and intermediate products contained in the exhaust gas and can treat them suitably depending on the components of the gas to be treated, it is preferred that the exhaust gas is brought into contact with a transition metal reacting agent heated to a predetermined temperature, such as iron reacting agent made of iron(Fe) heated to 400° C. or higher.

As a heating equipment for heating the above transition metal reacting agent, any heater such as an electric heater can be used. The heating temperature by this heating equipment, which might be different depending on the subject component or the reacting agent employed, is usually 400° C. or higher, for example 400° C. to 500° C., suitably.

Meanwhile, the reacting agent can be heated to the critical temperature, which depends on the material constituting the reactor 21, heat resistance of the reacting agent, etc. However, there is no improvement of treating efficiency even if the reacting agent is heated to such a high temperature unnecessarily, leading merely to loss of energy.

Meanwhile, in the case of stainless steel is employed in the reactor, heating to 500° C. or higher can cause dissociation of hydrogencloride gas and hydrogen to generate active hydrogen radical and accelerate embrittlement.

Further, in view of maintenance (replacement or activation of the reacting agent) etc. of the reactor 21, as shown in FIG. 2, it is desirable to install a plurality of reactor 21, 21 in parallel via valve and switchably.

It is also preferred that the discharge piping up to reactor 21, i.e., an exhaust gas passage from the outlet of the process chamber 12 via the exhaust pump 14 to the reactor 21, is provided with a heating equipment or a heat insulating equipment 17 and is heated or insulated to a suitable temperature, for example about 150° C., for preventing deposition in the passage.

However, since the gas temperature in the process chamber 12 is high, a high-capacity heater as a heating means, is not necessary, but it is sometimes good enough to wind the passage with a heating-insulating material and keep the temperature of the passage by it.

Accordingly, a suitable heating or heating-insulating equipment may be used depending on the length, material, etc. of the exhaust gas passage, and such equipments can be omitted in the case where the exhaust gas passage is short to allow flowing of a gas having a sufficient temperature into the reactor.

As described above, the inner wall surface of the above exhaust gas passage is preferable to be formed by chromium oxide film or alumina film. In the piping passage after such a heating treatment, corrosion may not occur even under the presence of active hydrogen chloride radicals.

By introducing an exhaust gas into the reactor 21 having such a constitution from the CVD apparatus 10, a part of the unreacted raw gas of TCS or DCS and the by-product per se are reacted and converted. Thus, hydrogen chloride is generated and the converted silicon is bonded to the transitional metal reacting agent or the like and then removed. Likewise, both boron and phosphorus in diboran and phosphine are removed by bonding to the reacting agent.

Though such a reaction requires hydrogen, since TCS and DCS per se contain hydrogen and hydrogen is used as the atmosphere gas or diluent gas in the usual epitaxial treatments, the reaction has no problem about hydrogen and the conversion reaction also can be carried out easily.

However, in the case where there is short of hydrogen in the exhaust gas, for example, when plasma is used for assisting the growth reaction, a hydrogen gas adding equipment may be attached to an exhaust gas passage on the upstream side of the reactor 21 to supply an adequate amount of hydrogen to it.

The exhaust gas discharged from the reactor 21 is introduced into the separator 22, and decomposed into the raw gas of TSC and DCS, and hydrogen chloride.

As for the constitution or the operating method of the separator 22, the operation pressure, the distillation temperature, and the number of the shelves of the distillator can be adequately selected, depending on the composition of the exhaust gas and the kind, recovery rate, and purity of the raw gas to be recovered.

For example, by using a distillation column with a shelf number of 7 and introducing the exhaust gas therein from the reactor 21, in the state that the pressure and the temperature of the shelf is 150 kPa and 283 K respectively, TCS with the hydrogen chloride concentration of 1 ppm or lower can be introduced into the top of the separator 22.

In that case, about 99% of the introduced TCS can be recovered. Halogenosilane gas such as TCS separated as above can be reutilized by being returned to the raw gas source 13 from the recovery passage 23.

On the other hand, the hydrogen chloride gas separated by distillation in the separator 22, is discharged from the bottom of the separator 22 into the vapor-liquid contact tub 24 so as to be brought contact with water and become hydrochloric acid water, and then escape from the passage 25.

Further, by using pure water with a resistivity of around 18 MΩ•cm, hydrochloric acid water with high purity can be produced and reutilized. Further, it is also advantageous that a material that can react with water and refine a harmless material is dissolved in water.

Furthermore, from the bottom of the separator 22, impurity components such as the used diborane and phosphine, and the decomposed or resolved products including boron or phosphorus are discharged to the passage 26 in a very small amount.

Since the transition metal reacting agent bonded with silicon in the reactor 21, such as iron, forms harmless iron silicide, it is preferred that the reacting agent is taken out from the reactor 21 after conversion reaction ends. At that time, by using an iron with a good purity, for example 97% or higher as a reacting agent, iron silicide with a good purity can be achieved, which can be reutilized as a ferrite steel source.

Figure 3:
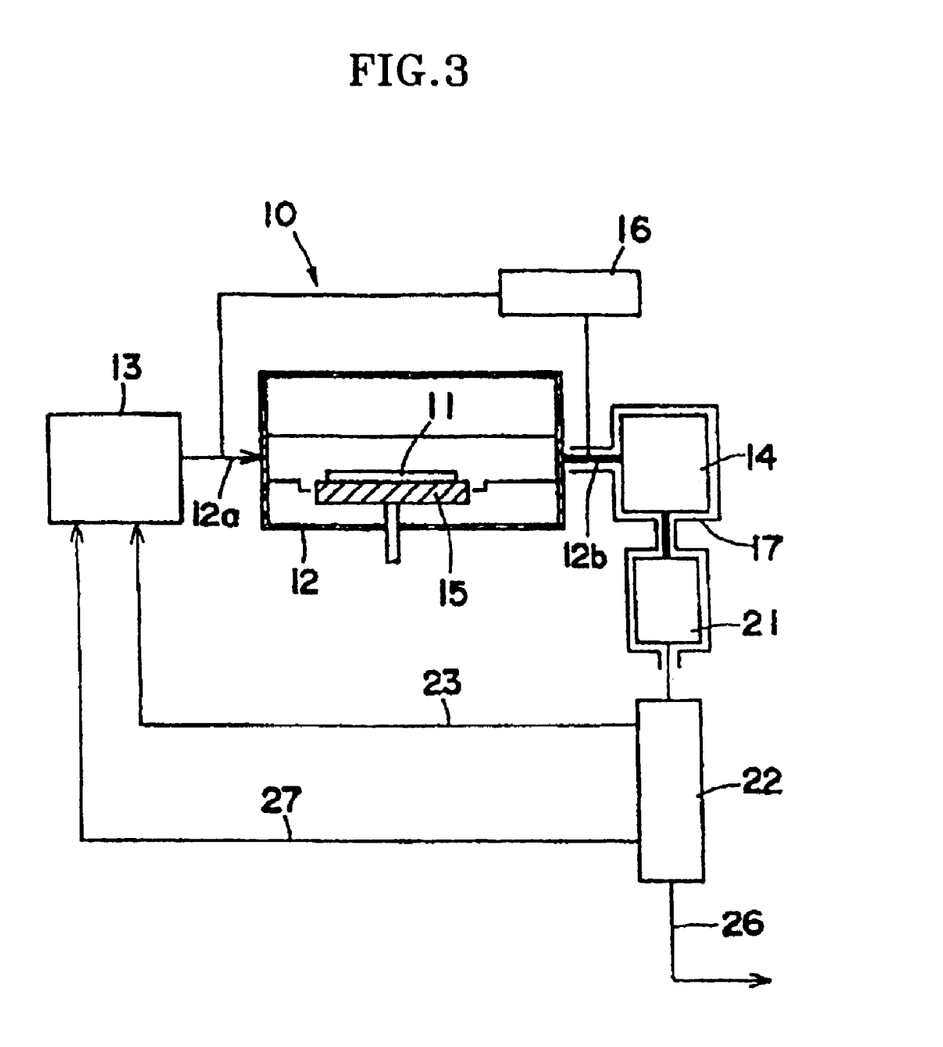
FIG. 3 is a system diagram showing the $2^{nd}$ embodiment according to the present invention.

FIG. 3 is a system diagram showing the $2^{nd}$ embodiment of the present invention. Through the drawings, like reference numerals are used for designation of like or equivalent portions as in FIG. 1 and redundant references will be omitted.

In this embodiment, the hydrogen chloride gas separated in the separator 22 after discharged from the reactor 21, is returned to above raw gas source 13 via the passage 27, instead of being introduced into the above vapor-liquid contact tub 24 as in the $1^{st}$ embodiment, and reutilized as a cleaning gas or the like. By this method, the cost for hydrogen chloride can be sharply reduced.

Figure 4:
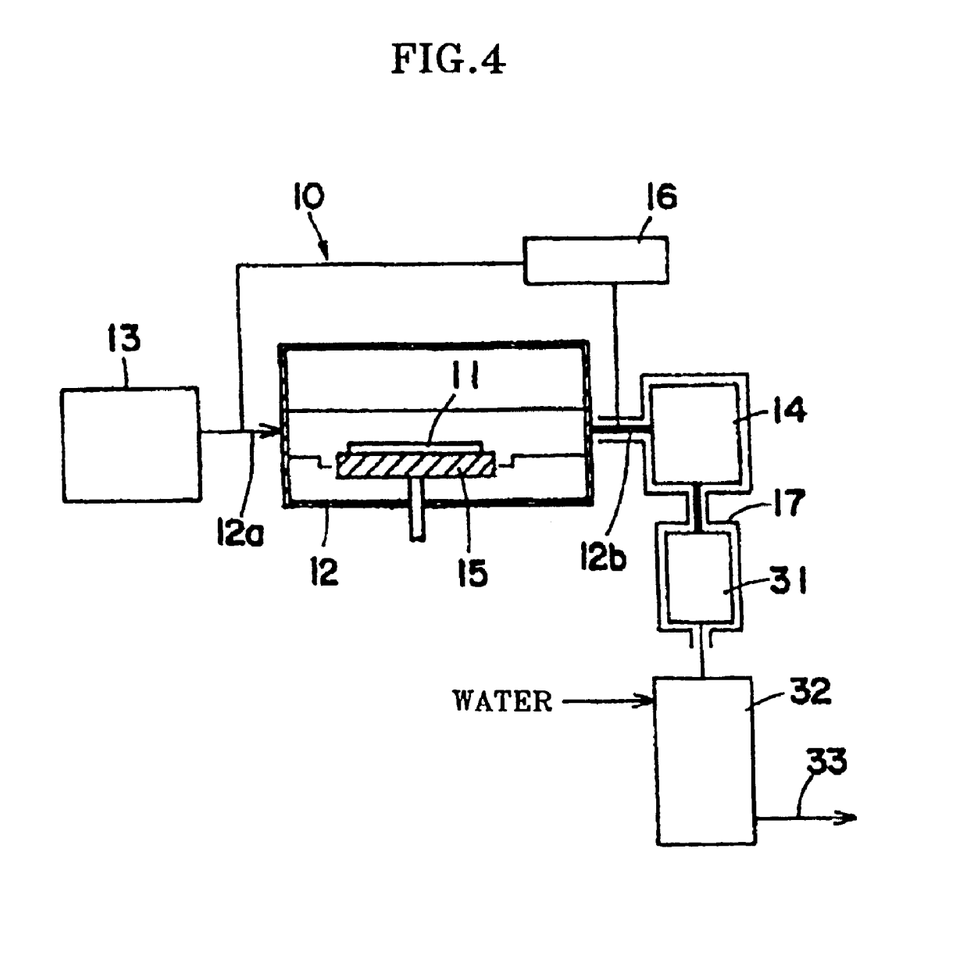
FIG. 4 is a system diagram showing the 3rd embodiment according to the present invention
Figure 5:
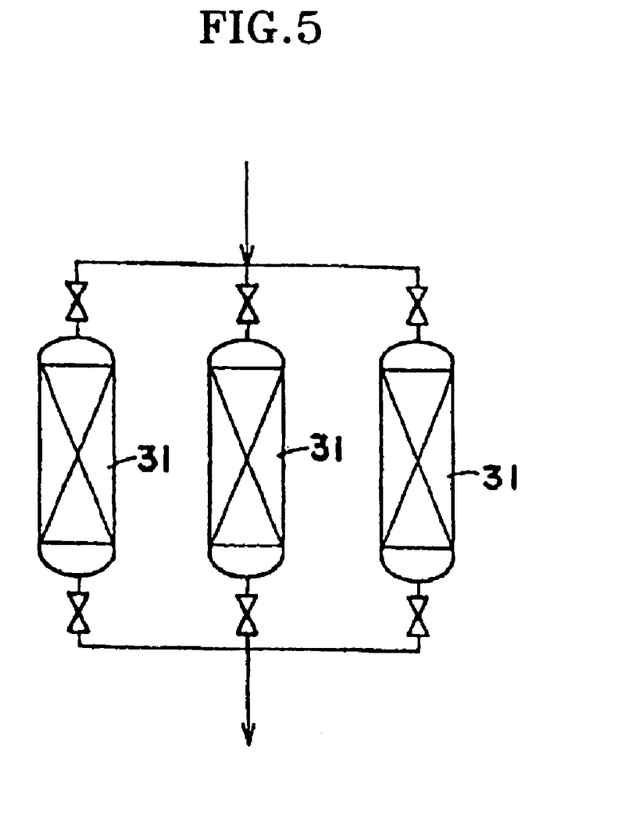
FIG. 5 is a simplified system diagram showing an example of a reactor of the 3rd embodiment

FIG. 4 is a system diagram showing the $3^{rd}$ embodiment and FIG. 5 is a simplified system diagram showing an example of the reactor.

In this embodiment, an example where a reactor 31 as a decomposition reaction means for decomposition or conversion of the unreacted raw gas or high-boiling intermediate products included in the exhaust gas, and a vapor-liquid contacting tub 32 for bring the hydrogen chloride gas discharged from the reactor 31 into contact with water and producing hydrochloric acid water are connected, is shown.

As for the reactor 31 used herein, which carries out entire decomposition treatment of the unreacted raw gas or the intermediate products in the exhaust gas, it can be such that a transition metal reacting agent, for example, iron is packed with and thermal-swing is performed between room temperature and 500° C. Further, as a heating equipment for heating the above transition metal reacting agent, any heater such as an electric heater can be used.

Besides, considering the switching operation resulting from the maintenance and the thermal-swing, it is preferred that at least 3 or more reactors 31, 31 are installed in parallel via valves so that the respective reactors are successively switched in an order of 3 processes of temperature elevating process, temperature descending process and waiting process.

When an exhaust gas from a CVD system is introduced to the reactor 31 having such constitution, TCS, DCS and by-products per se are reacted to be decomposed or converted. The greatest part of chlorine is converted to hydrogen chloride, whereas silicon is bonded to the transition metal reacting agent. Likewise, boron and phosphorus in diborane and phosphine are removed by bonding to the reacting agent. From this, the greatest part of the gas exhausted from the reactor 31 is converted to hydrogen chloride gas. Accordingly, by bringing hydrogen chloride gas exhausted form the reactor 31 into contact with water in the vapor-liquid contacting tub 32 connected to the downstream side of the reactor 31, useful hydrochloric acid water can be taken out from the passage 33.

On the other hand, the reactor 31 may be operated for a partial decomposition as well as for a full decomposition. The type of the decomposition can be regulated by changing the average gas contact time in the reactor.

Further, even in the case of being short of hydrogen for the reaction in the reactor 31, there is no problem if hydrogen can be added adequately. And, iron bonded with silicon in the reactor 31 forms iron silicide as above, which can be reutilized as a source for ferrite steel.

Further, by using, as water for being used in the vapor-liquid contact tub 32, pure water with a resistivity of around 18 MΩ•cm as described above, hydrochloric acid water with high purity can be obtained.

As described above, by carrying out treatment of CVD exhaust gas as in the respective embodiments, the adsorption of the deposits on the inner wall surface of the exhaust piping can be prevented, the periodical maintenance for removing the deposits can be unnecessary, and the operation rate of CVD system can be elevated.

And, the raw gas, etc. can be reused and the treated product can be utilized in other use, resulting in curtailment of the cost for detoxicating CVD exhaust gas.

For example, the detoxicating cost for the $1^{st}$ embodiment, the $2^{nd}$ embodiment and the $3^{rd}$ embodiment can be lowered to around 50%, 40% and 30% of the conventional detoxicating cost.

(Embodiment 1)

In a system with the constitution as illustrated in FIG. 1, an FT-IR was attached to the downstream side of the reactor packed with an iron reacting agent, and the gas components flowing out of the reactor 21 were analyzed.

Figure 6:
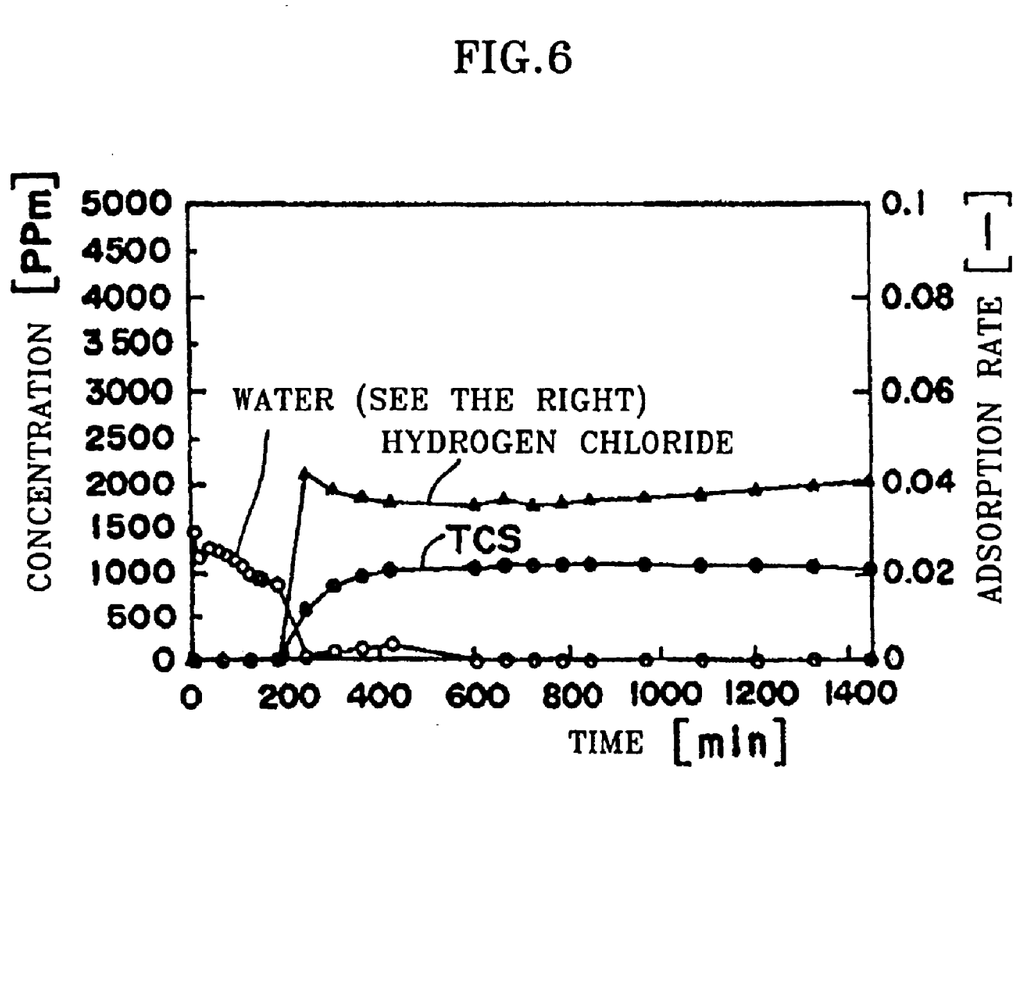
FIG. 6 is a chart showing results of measuring the change of the gas component flowed out of a reactor in test example 1.

While film-forming treatment was carried out under feeding of a sample nitrogen gas containing 2000 ppm of TCS to the CVD system, the heating temperature of the reactor was maintained at 450° C., to measure change in the components in the gas flowing out of the reactor. The results are shown in FIG. 6.

In the beginning period of the reactor operation, water was detected because of the aging (removing iron-oxide film with hydrogen) of iron used as a reactant. However, when the test gas was flowed at the time the water generation decreases, a constant concentration of TCS and hydrogen chloride gas were observed. And, the intermediate products were never observed.

Next, the gas flowed out of the reactor was introduced into the separator of 150 kPa of pressure and 283 K of temperature and then a distillation was conducted for confirming the separation performance. The separator with 6 m of column height, 7 of shelf number and 180 mm of column diameter was used. The recovery amount of TCS was obtained by measuring the hydrogen chloride concentration in TCS and the recovered flow amount. As a result, the concentration of the recovered hydrogen chloride in TCS was found to be under the detection limit (under 1 ppm). The TCS flow amount at the inlet of the separator was obtained as shown in FIG. 6 and the recovery rate calculated from the recovered flow amount was 90%.

(Embodiment 2)

In a system of the constitution as illustrated as the $3^{rd}$ embodiment, an FT-IR was attached to the downstream side of the reactor packed with an iron reacting agent, and the gas components flowing out of the reactor 21 were analyzed.

Figure 7:
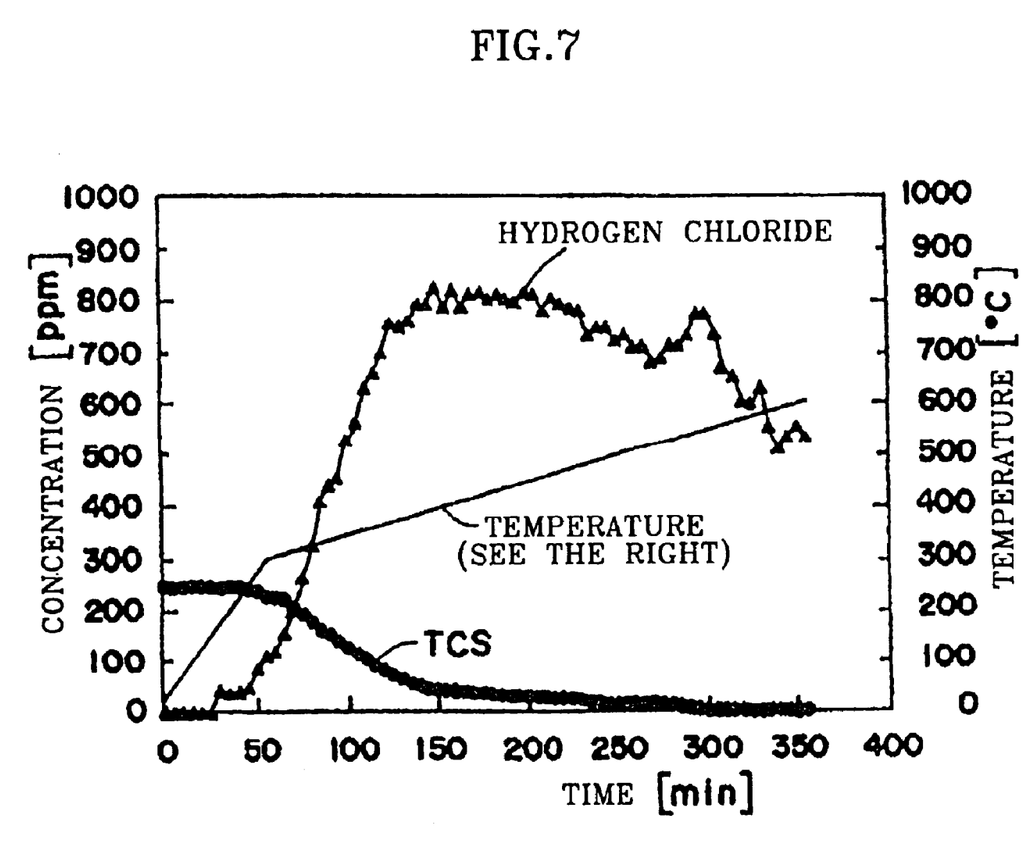
FIG. 7 is a chart showing results of measuring the change of the gas component flowed out of a reactor in test example 2.

While film-forming treatment was carried out by feeding of a sample nitrogen gas containing 250 ppm of TCS into the CVD system, the heating temperature of the reactor was changed from room temperature to 600° C., and the change in the components in the gas flowing out of the reactor was measured.

The gas amount introduced into the reactor from the CVD system was 40 L/min and the superficial velocity of the reactor was 3.5 cm/s. And, the average gas contact time in the reactor was about 1 second. The results are shown in FIG. 7. As shown in FIG. 7, TCS was partially decomposed to produce hydrogen chloride at above 400° C. In this case, the intermediate products were never observed.

(Embodiment 3)

In a system of the constitution as illustrated as the $3^{rd}$ embodiment, the change of the gas component flowed from the reactor was measured by the method of the above embodiment 2. The gas amount introduced into the reactor from the CVD system was 40 L/min and the superficial velocity of the reactor was 3.5 cm/s, but the average gas contact time in the reactor was increased up to about 10 second at this time. As a result, TCS began to be totally decomposed to produce hydrogen chloride at above 400° C. Likewise, in this case, the intermediate products were never observed.

Hydrogen chloride flowed out of the reactor was brought into contact with pure water with a resistivity of around 17 MΩ•cm, and thus hydrochloric acid water was produced. In the case of 35 wt % of hydrochloric acid concentration, silicon concentration in the hydrochloric acid was about 2 ppm and an impurity such as iron was not observed.

As described above, since the apparatus and process for treating and recovering CVD exhaust gas according to the present invention can decompose or convert a part of an unreacted raw gas and intermediate products of CVD apparatus to hydrogen chloride which can be treated extremely easily, there occurs neither deposition on the inner wall surface of the exhaust piping nor need for periodical maintenance for removing the deposit to improve the operation rate of the CVD system.

Further, an exhaust gas from a reactor can be separated by distillation with good efficiency and the raw gas can be reutilized. And, hydrogen chloride, which can be reutilized as such, can be detoxicated by vapor-liquid contact with pure water, to reuse the hydrochloric water formed the reaction as a new material.

And, by adapting thermal-swing type in the reactor, the raw gas can be fully decomposed so that hydrogen chloride gas is pulled out and thus the maintenance become unnecessary.

In this case, likewise, the hydrogen chloride gas can be reutilized as a high-purity hydrochloric acid by being reacted with hydrogen chloride gas.

Accordingly, from the fact that the CVD exhaust gas can be efficiently treated and the operation rate of CVD system can be improved, the cost can be lowered in a whole owing to both reduced detoxification cost and improved productivity.

What is claimed is:

1. A process for treating an exhaust gas let out from CVD system for forming a silicon film using halogenosilane gas, the process comprising the steps of:

subjecting an unreacted raw gas and intermediate products included in the exhaust gas to a partial decomposition or conversion reaction treatment using a heated transition metal reacting agent;

separating the obtained halogenosilane gas and hydrogen chloride gas; and returning at least one of the halogenosilane gas and hydrogen chloride gas to a raw gas source for the CVD system.

2. A process for treating an exhaust gas let out from CVD system for forming a silicon film using halogenosilane gas, the process comprising the steps of:

subjecting an unreacted raw gas and intermediate products included in the exhaust gas to a full decomposition or conversion reaction treatment using an iron reacting agent for thermal-swing between room temperature and 500° C.; and contacting the obtained hydrogen chloride gas of the decomposed product with water; and recovering the hydrochloric acid water.

* * * * *